(12) United States Patent
Briney

(10) Patent No.: US 9,394,025 B2
(45) Date of Patent: Jul. 19, 2016

(54) HEATED BOTTLE CAGE FOR BICYCLE

(71) Applicant: Thomas I. Briney, Chicago, IL (US)

(72) Inventor: Thomas I. Briney, Chicago, IL (US)

(*) Notice: Subject to any disclaimer, the term of this patent is extended or adjusted under 35 U.S.C. 154(b) by 0 days.

(21) Appl. No.: 14/462,089

(22) Filed: Aug. 18, 2014

(65) Prior Publication Data
US 2016/0046341 A1    Feb. 18, 2016

(51) Int. Cl.
 *B62J 11/00*     (2006.01)
 *H05B 3/06*      (2006.01)

(52) U.S. Cl.
 CPC .. *B62J 11/00* (2013.01); *H05B 3/06* (2013.01)

(58) Field of Classification Search
 CPC .......... B60N 3/03; B60N 3/104; B62J 11/00; B62J 6/003; B62J 2099/004; Y10S 224/92; H05B 3/06
 USPC ........................................................ 224/414
 See application file for complete search history.

(56) References Cited

U.S. PATENT DOCUMENTS

| | | | | |
|---|---|---|---|---|
| 3,420,982 A | * | 1/1969 | Hager, Jr. .................. | F26B 3/28 141/82 |
| 4,830,240 A | * | 5/1989 | Tackles .................... | B62J 11/00 224/414 |
| 5,170,981 A | * | 12/1992 | Lin .......................... | B62J 11/00 224/414 |
| 6,182,464 B1 | * | 2/2001 | Mamich .................... | A45F 3/16 62/316 |
| 6,422,300 B1 | * | 7/2002 | Wylin ................ | B60H 1/00271 165/41 |
| 6,932,255 B2 | * | 8/2005 | Van Houtte .............. | B62J 11/00 224/414 |
| 8,439,221 B2 | * | 5/2013 | Davis ..................... | A45C 11/20 220/592.01 |
| 2004/0256428 A1 | * | 12/2004 | Meggiolan ............... | B62J 11/00 224/414 |
| 2008/0041859 A1 | * | 2/2008 | Teglbjarg ............ | A47J 36/2411 220/592.16 |

* cited by examiner

*Primary Examiner* — Adam Waggenspack
(74) *Attorney, Agent, or Firm* — Levenfeld Pearlstein, LLC

(57) ABSTRACT

A heated bottle cage for a bicycle is provided. The bottle cage includes a main body having an elongated spine configured for mounting to an adjacent portion of a bicycle frame, a base tab extending from the elongated spine, and at least one band extending from the elongated spine at a position spaced from the base tab. The bottle cage further includes a heating element for applying heat to a bottle positioned within the bottle cage. The bottle cage may also include a housing configured to house a power source that is operatively connected to the heating element for providing energy to the heating element.

19 Claims, 6 Drawing Sheets

HEATED BOTTLE CAGE FOR BICYCLE

BACKGROUND

The following description relates to an accessory for a bicycle, and in particular, a bottle cage or holder having a heating element for heating a. bottle and the contents thereof.

Bicycles may accommodate a variety of accessories. One such accessory is a bottle cage or holder that may be secured to the bicycle frame, seat or seat post. The bottle cage or holder is configured to hold a bottle, which may contain a refreshment, such as water or a sports drink. The bottles are typically designed to discharge the contents (i.e., the refreshment) through a fluid nozzle, straw or tube. Accordingly, a cyclist may ride with and store the bottle on the bicycle, access the bottle and consume the contents as desired.

Bottle cages may be formed having standard dimensions for mounting to the bicycle frame and standard dimension for holding a standard sized water bottle. For example, a bottle cage may be secured to a tube of bicycle frame by inserting fastener through two spaced apart holes on the bottle cage. Likewise, a tube of a bicycle frame configured for having a bottle cage secured thereto typically includes two corresponding spaced apart holes. In a standard bottle cage, the holes are spaced apart approximately 64 mm. The holes on the tube of the bicycle frame are spaced apart by a corresponding distance. Accordingly, different standard bottle cages may be secured to different bicycle frames having spaced apart holes in line with the standard. In addition, standard bottle cages may include a protrusion configured to engage a recess or groove in a water bottle. The protrusion is typically positioned 73 mm from a bottom tab or lower base of the bottle cage.

Bicycles may be operated in a variety of climates, conditions and seasons. When operating in warmer climates, contents of the bottle may remain in a liquid state. However, when operating in colder climates or conditions, for example, near or below freezing temperatures (0 degrees Celsius), the contents may freeze (i.e., transition to a solid state) in the bottle, and thus, may not flow through the fluid nozzle, straw or tube to be easily consumed by the cyclist. In addition, the bottle cage may be cooled by the ambient air at or near a freezing temperature, and may approach a temperature equal to that of the ambient air. Thus, the bottle may be in conductive contact with the cage where the cage serves as another lower temperature source.

Accordingly, it is desirable to provide a bicycle accessory, such as a bottle cage, that is heated to maintain the contents of the bottle in a liquid state.

SUMMARY

According to one aspect, there is provided a bottle cage for a bicycle. The bottle cage includes a main body having an elongated spine configured for mounting to an adjacent portion of a bicycle frame, abuse tab extending from the elongated spine, and at least one band extending from the elongated spine at a position spaced from the base tab. The bottle cage further includes a heating element for applying heat to a bottle positioned within the bottle cage and a housing configured to house a power source that is operatively connected to the heating element for providing energy to the heat source.

According to another aspect, there is provided a bottle cage for a bicycle, the bottle cage including a main body having an elongated spine configured for mounting to an adjacent portion of a bicycle frame, a base tab extending from the elongated spine, and at least one band extending from the elongated spine. The bottle cage further includes a heating element for applying heat to a bottle positioned within the bottle cage and an electrical connection in electrical communication with the heating element. The heating element is configured for operative connection to a power source, via the electrical connection, to receive an electric current from the power source.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1:
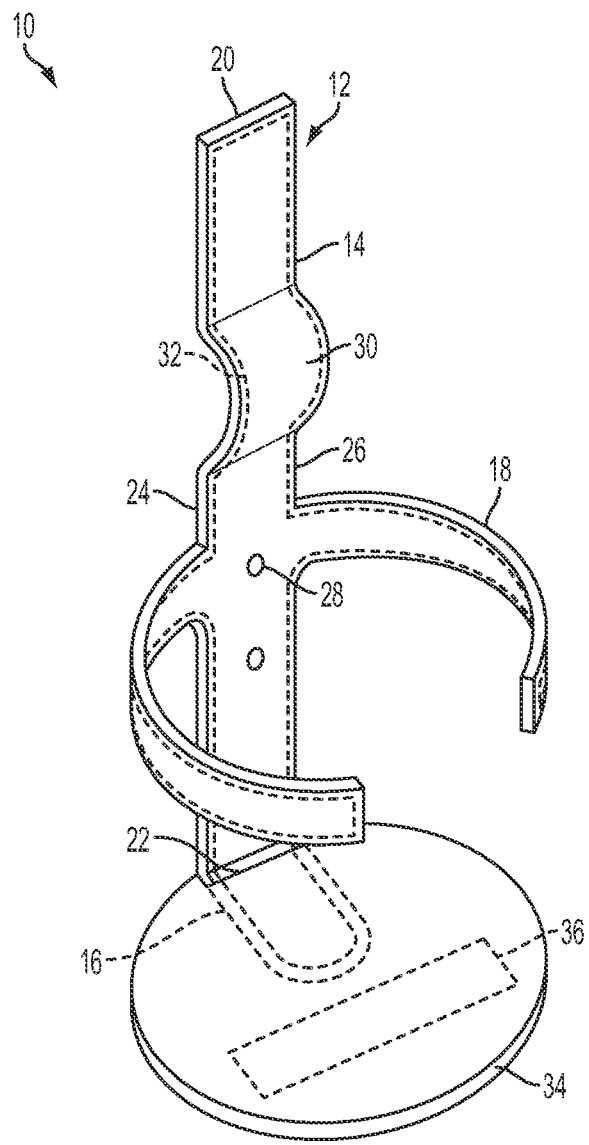
FIG. 1 is perspective view of an example of a heated bottle cage for a bicycle according to an embodiment described herein.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2:
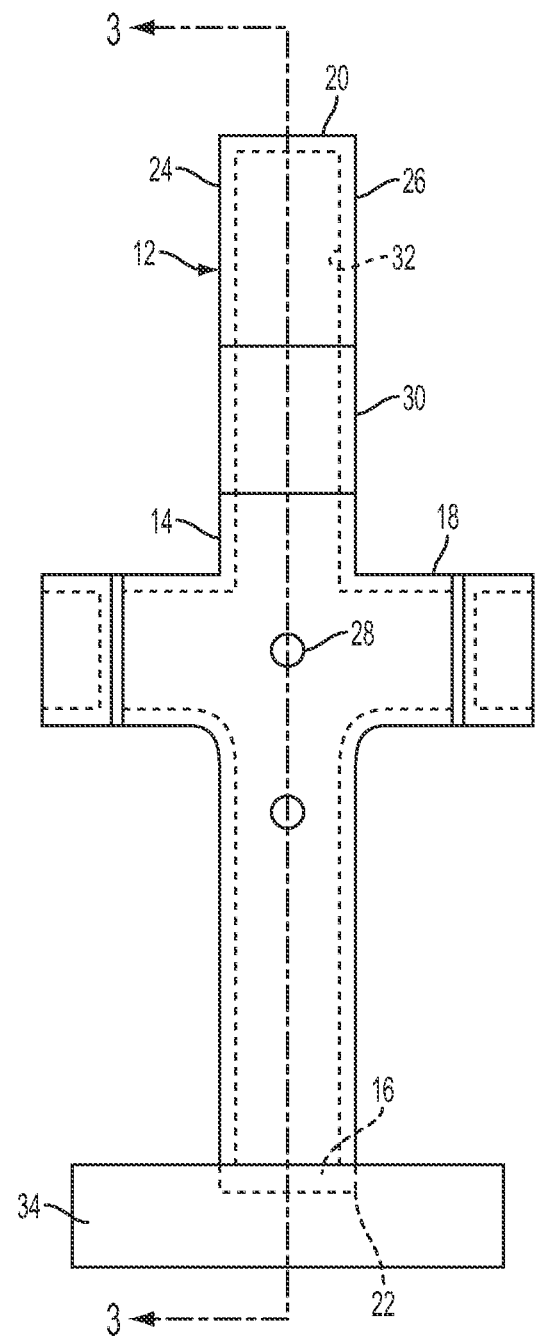
FIG. 2 is a front view of the heated bottle cage of FIG. 1.

FIG. 1 is a perspective view of a heated bottle cage 10 for a bicycle (not shown) according to an embodiment described herein. FIG. 2 is a front view of the heated bottle cage 10 of FIG. 1. Referring to FIGS. 1 and 2, the heated bottle cage 10 includes a main body 12 having an elongated spine 14, a base tab 16 extending outwardly relative to the elongated spine 14, and at least one band 18 extending from the elongated spine 14. In a non-limiting embodiment, the at least one band 18 extends from the elongated spine 14 at a position spaced from the base tab 16.

The elongated spine 14 extends generally in a longitudinal direction between a first end 20 and a second end 22, defining a length therebetween. in one embodiment, the first end 20 corresponds to an upper end of the main body 12 and the second end 22 corresponds to a lower end of the main body 12. The elongated spine 14 further includes a first lateral side 24 and a second lateral side 26 defining a width of the spine 14.

The heated bottle cage 10 is configured to be secured to a bicycle frame (not shown). For example, the bottle cage 10 may be secured to a tube of the bicycle frame, a seat or a seat post. In one embodiment, the elongated spine 14 may include at least one fastener opening 28 configured to receive a fastener (not shown) for securing to the heated bottle cage 10 to a tube of the bicycle frame. For example, a pair of fastener openings or lugs 28 may be formed in the elongated spine 14. The fastener openings 28 may be spaced apart by a standard distance, e.g., 64 mm, so that the heated bottle cage 10 may be secured to bicycles having corresponding standard fastening openings. It is understood, however, that the present disclosure is not limited to this example, and the fastener openings 28 may be manufactured spaced apart by varying distances depending on a specific application. is further understood that alternative or additional features may be included to secure the heated bottle cage 10 to the bicycle frame. For example, a clamp, such as at/be or hose clamp, a hook, an adhesive, or other suitable securing mechanism may be connected to, or used with, the elongated spine 14 for securing the main body 12 to at/be of the bicycle frame, a seat, a seat post, or component of the bicycle.

Still referring to FIGS. 1 and 2, the base tab 16 extends from the elongated spine 14. In one embodiment, the base tab 16 may extend at approximately a right angle from the elongated spine 14 at or near the second end 22 of the elongated spine 14. However, the present disclosure is not limited to this example. The base tab 16 may have a width that is substantially equal to a width of the elongated spine 14. Alternatively, the base tab 16 may have an increased width compared to the elongated spine 14. For example, the base tab 16 may be formed as a generally round or circular plate so that a surface contact area between the base tab 16 and a bottle (not shown) held in the heated bottle cage 10 may be increased. In use, the base tab 16 may serve as a lower stop or support for a bottle positioned in the heated battle cage 10.

The at least one band 18 may extend from one of the first lateral side 24 and the second lateral side 26 of the elongated spine 14. In one embodiment, the at least one band 18 is generally rounded or curved, for example, as a segment of a circle, and is configured to receive at least a portion of bottle within the rounded or curved portion. The rounded or curved band 18 may be sized and shaped to generally correspond to an outer or circumferential profile of rounded or curved bottle to be held in the heated bottle cage 10. In one embodiment, the main body 12 includes two bands 18. The bands 18, may, for example, extend symmetrically (see top view in FIGS. 6 and 7) relative to one another from respective opposite lateral sides 24, 26 of the elongated spine 14. Alternatively, the at least one band 18 may be formed as a single band 18, where one end extends the first lateral side 24 of the elongated spine, in a generally circular path, and a second end is joined with the second lateral side 26 of the elongated spine 14 so as to form a closed loop. Accordingly, in this embodiment, the band 18 may be formed in a substantially complete circular or generally circular shape and is configured to receive a bottle therein. In use, the at least one band 18 may serve as a circumferential support for a bottle received in the heated bottle cage 10. In other embodiment, the at least one band 18 may be directly connected to the base tab 16, so as to extend from one of or both the elongated spine 14 and the base tab 16.

Still referring to FIGS. 1 and 2, the elongated spine 14 may further include a projection 30. The projection 30 is configured to engage a corresponding recess or groove on the bottle (not shown). In one embodiment, the projection 30 may be positioned at a location corresponding to a height on a standard bottle where the corresponding recess or groove is positioned. For example, the projection 30 may be positioned approximately 73 mm from the base tab 16. However, it is understood that the present disclosure is not limited to this example. In use, the projection 30 may serve to vertically retain the bottle in the heated bottle cage 10. In some embodiments, the projection 30 is received in the corresponding recess or groove on the bottle in a snap-fit manner.

The heated bottle cage 10 further includes a heating element 32. The heating element 32 is configured to be energized so as discharge thermal (heat) energy. Thus, the heating element 32 may transfer heat energy to a bottle positioned in the heated bottle cage 10. In one embodiment, the heating element 32 may be a metallic layer, such as a thin film or foil, that may be energized to discharge thermal energy. Preferably, the metallic layer is made from an electrically conductive material that may conduct an electric current an as to be resistively heated, However, the present disclosure is not limited to such a heating element. The heating element 32 may coextend with the main body 12, such that the heating element 32 extends along one or more of the elongated spine 14, the base tab 16 and the at least one band 18. Alternatively, the heating element 32 may extend along any single part of the main body 12, for example, it may extend only along the spine 14, base tab 16 or band 18.

The heated bottle cage 10 may further include a housing 34 configured to house a power source 36 that may be operatively connected to the heating element 32. In one embodiment, the housing 34 may be detachably secured to the main body 10. For example, the housing 34 may be detachably secured to the bottom tab 16. The heating element 32 may extend in the housing 34 as well The housing 34 may be formed generally as a disc or puck shaped element and may be used to increase a surface contact area with a bottom end of a bottle positioned in the bottle cage 10. The housing 34 may alternatively be formed as a generally square or rectangular cube, other polygonal shape or irregular shape. The housing 34 may further include rounded or angled portions for aerodynamic, aesthetic or space saving purposes. Alternatively, and with reference to FIG. 4, the housing 134 may be formed integrally and non-removably with the main body 12. For example, the housing 134 may be formed on an underside of the base tab 16, and dimensioned to accept a predetermined power source, such as a specific battery type. In another embodiment, the heated bottle cage 10 may be formed without the housing. For example, the heating element 32 may be energized by a power source 36 positioned on the bicycle remotely from the heated bottle cage 10, and connected to the heating element via electrical wiring, for example. In this embodiment, the bottle cage 10 or heating element 32 may have an electrical contact or connector 42 (see FIG. 3), connected to the heating element 32 configured for electrical connection to the power source 36. The electrical contact or connector 42 may be, for example, an exposed terminal or node configured to contact the power source or intermediate connector connected to the power source, or a positive locking connector configured to engage a corresponding positive locking connector that is connected to the power source. Other known suitable electrical connectors or contacts may be used as well.

The power source 36 may be electrically connected to the heating element 32 through a known and suitable electrical connection. For example, the power source 36 may be connected to the heating element 32 through contacting terminals, electrical wiring, or other suitable electrical connectors that allow electric current to flow from the power source 36 to the heating element 32. The power source 36 may be, for example, a battery, such as a lithium-ion battery. In one embodiment, the battery is rechargeable. Accordingly, the housing 34 may serve as a charging receptacle to permit recharging of the batter 36, However, the present disclosure is not limited to this example. For example, alternative or additional power sources may be used, such as solar or thin film batteries.

In one embodiment, it is desirable to form the main body 12 from a strong, lightweight material, such as carbon fiber or a suitably hard plastic. It may also be desirable to form the main body 12 of a material that may conduct heat from the heating element 32, For example, the main body 12 may also be formed from a lightweight metal material, such as aluminum.

The housing 34 may be made from a similar or different material as the main body 12. in an embodiment in which the main body 12 is formed from a thermally conductive material (e.g., aluminum), thermal insulators, for example, rubber insulators (not shown) may be used at a connection of the main body 12 to the bicycle to reduce heat transfer to the bicycle frame.

Figure 3:
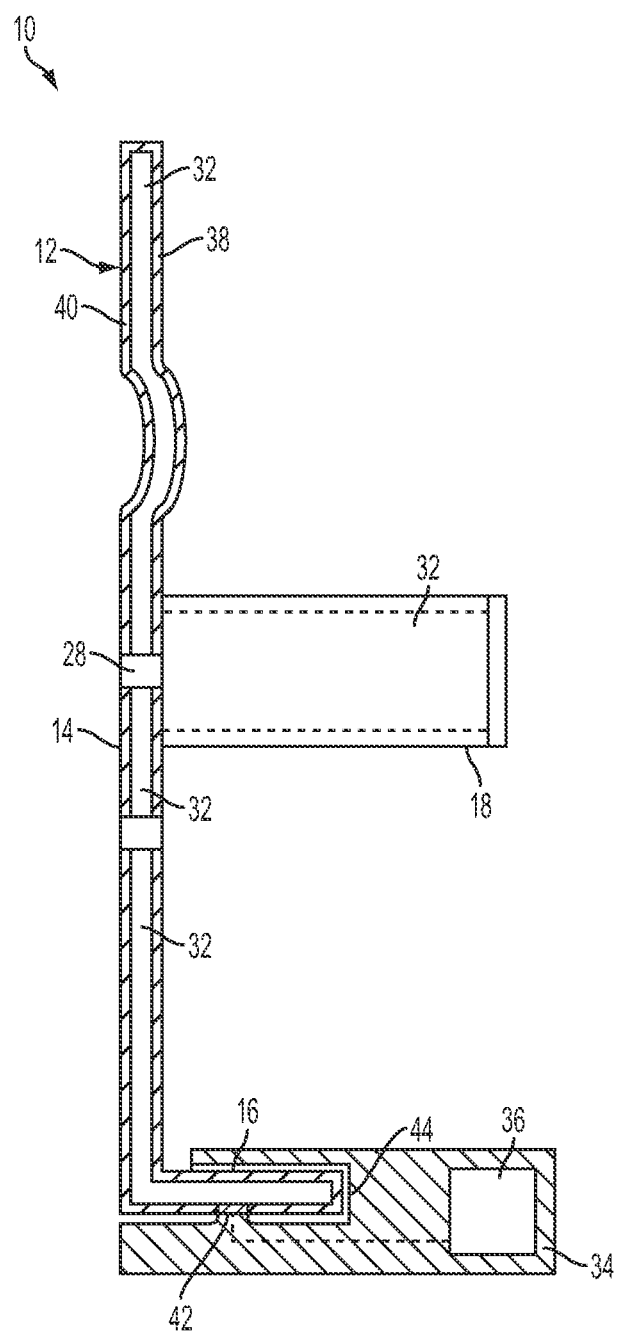
FIG. 3 is a cross-sectional view of the embodiment of the heated bottle cage shown in FIG. 2 taken at 3-3.

FIG. 3 is a cross-sectional view of the heated bottle cage 10 taken at section 3-3 of FIG. 2, according to an embodiment disclosed herein. Referring to FIG. 3, the heating element 32 may be embedded in the main body 10. In one embodiment, the main body 12 may include a first layer 38 and a second layer 40 and the heating element 32 is positioned between the first layer 38 and the second layer 40. The connector 42 may extend front the heating element 32 through one of the first layer 38 or second layer 40 for connecting to the power source 36.

Still referring to FIG. 3, in one embodiment, the housing 34 may be detachably secured to the base tab 16 by receiving the base tab 16 in a slot 44 formed in the housing 34. The housing 34 may be releasably secured to the base tab 16 by way of, for example, an interference or snap-fit. Alternatively, or in addition, the housing 34 may be secured to the base tab 16 using a known fastener or fasteners.

Figure 4:
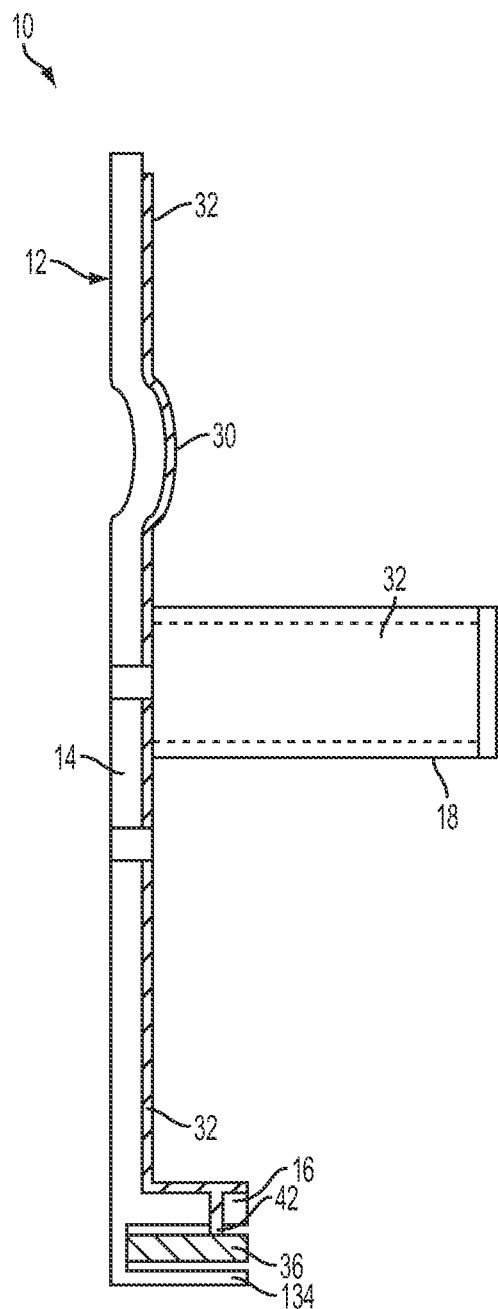
FIG. 4 is a cross-sectional view of the heated bottle cage according to another embodiment.

FIG. 4 is a cross-sectional view of the heated bottle cage 10 according to another embodiment. Referring to FIG. 4, the heating element 32 may be positioned on an outer surface of the main body 12. For example, the heating element 32 may be positioned on the main body 12 so as to be in direct contact with a bottle when the bottle is positioned in the bottle cage 10. In one embodiment, the main body 12 and the heating element 32 may be formed as an integral, monolithic unit. That is, the main body 12 may be formed from an electrically conductive material that may be resistively heated by conducting an electric current from the power supply 36.

Figure 5:
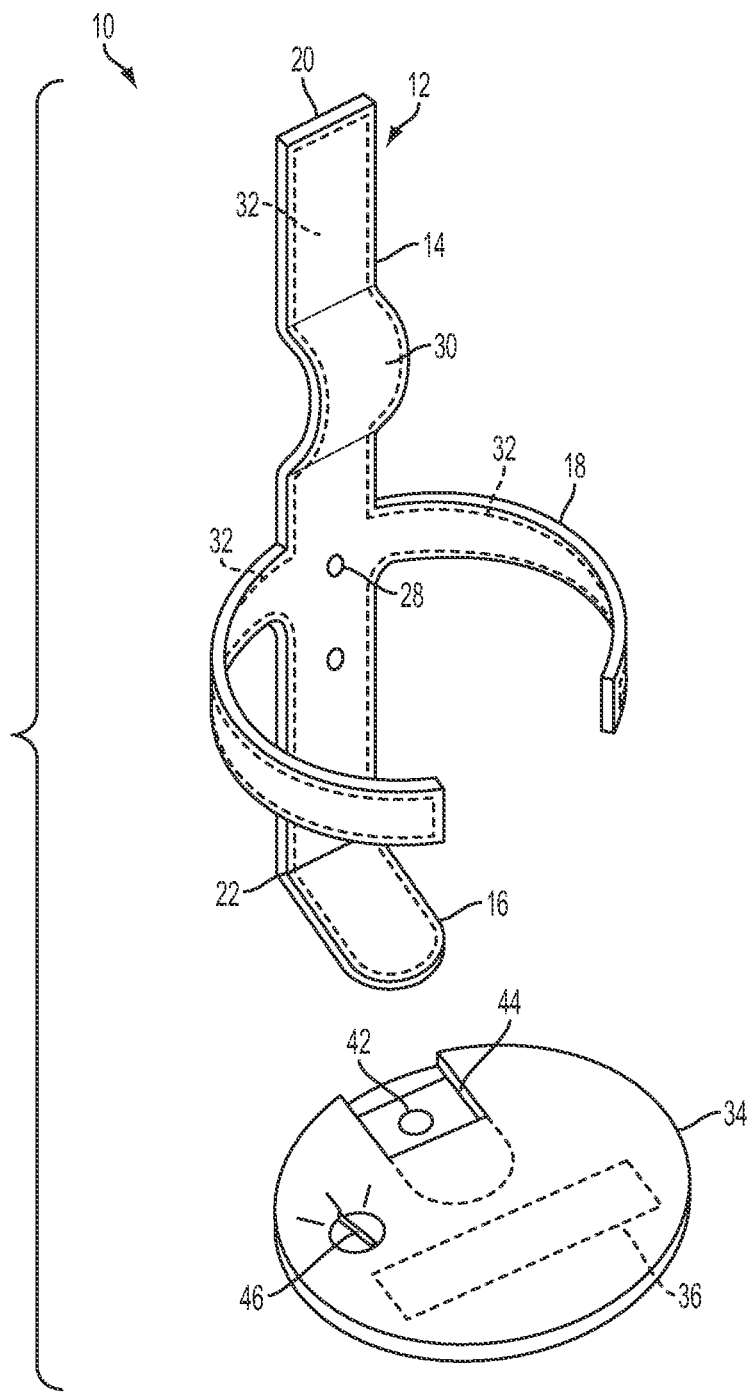
FIG. 5 is an exploded perspective view of the heated bottle cage of FIG. 1 including a housing for a power supply.
Figure 6:
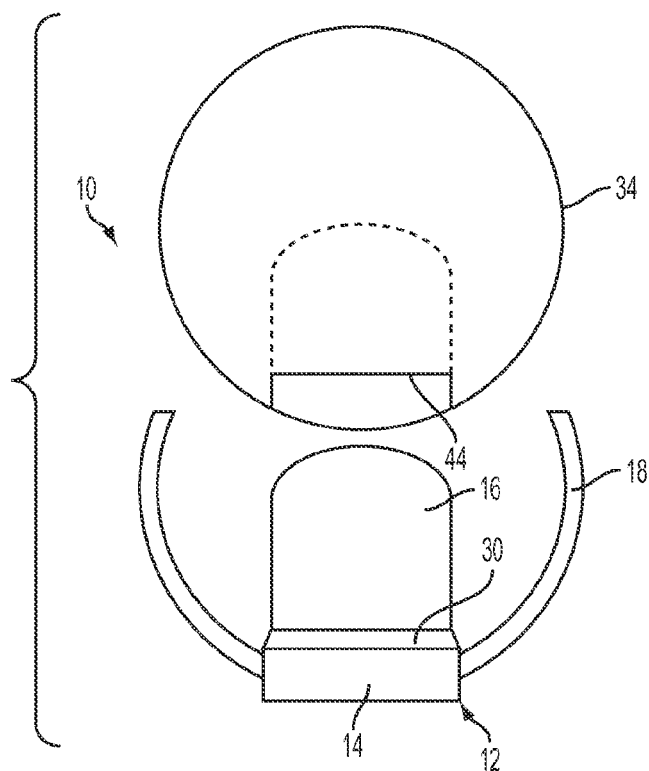
FIG. 6 is a top view of the heated bottle cage of FIG. 5.

FIG. 5 is an exploded perspective view of the heated bottle cage 10 of FIG. 1 showing the housing 34 in a detached position. FIG. 6 is atop view of the heated bottle cage 10 of FIG. 5 with the housing 34 in the detached position. Referring to FIG. 5, the heated bottle cage 10 may include a control switch or knob 46 that may be operatively connected to the power source 36 and/or control circuitry between the power source 36 and the heating element 32 to control the electric current delivered to the heating element 32. Accordingly, the amount of energy discharged from the heating element 32 may be adjusted by using the control switch 46. Further, the switch or knob 46 may be switched to an "OFF" position where no (or only negligible) energy is supplied from the power source 36 to the heating element 32. In one embodiment, the switch or knob 46 may be positioned on the housing 34. However, the present disclosure is not limited to this configuration. The switch or knob 46 may be incorporated as, for example, a rotary knob, a rocker switch, a slider or other similar suitable mechanism.

Figure 7:
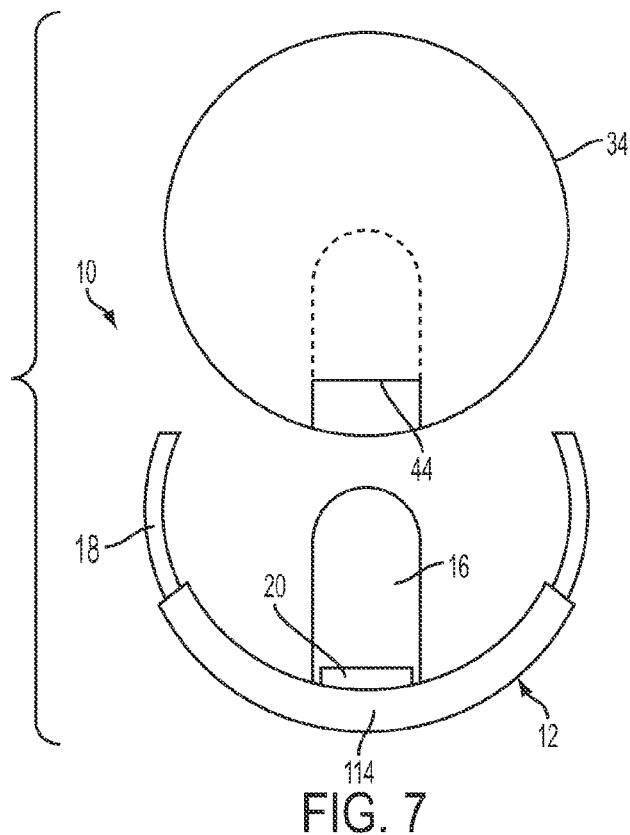
FIG. 7 is a top view of the heated bottle cage according to another embodiment.

In some embodiments, it may be desirable to increase or maximize the surface area of the main body 12, for example, at the elongated spine 14, the base tab 16 and/or the at least one band 18. Accordingly, a larger surface area may be provided from which heat energy may be discharged, thereby facilitating heat transfer to the bottle over a larger surface area. For example, FIG. 7 shows a top view of the heated bottle cage 10 according to another embodiment, where the elongated spine 114 has an increased width. In addition, the elongated spine 114 may include a contour or profile that substantially corresponds to an outer circumference of a standard bottle to be held in the bottle cage 10.

In accordance with the examples described herein, a bottle may be positioned in the heated bottle cage 10 such that a bottom of the bottle is supported by the base tab 16 and is laterally supported by the at least one band 18. The bottle may be held in the cage 10, in part, by way of the projection 30 extending into a recess or groove on the bottle, The bottle cage 10 may be mounted to a tube of bicycle frame, for example, by inserting fasteners through the respective fastener openings 28 formed in the elongated spine 14.

A user (e.g., a cyclist) may attach the power source 36 to the bottle cage 10. In one example, the power source 36 may be positioned in a housing 34 that may be releasably secured to the main body 12. For example, the housing 34 may be include a slot configured to receive at least a portion of the base tab 16 there to position the housing on the main body. The power source 36 may then be operatively connected to the heating element 32 by way of an electrical connector 42, so that the heating element 32 may receive electric current the power source 36. In other examples, the power source 36 may be positioned in a housing formed integrally with the main body 12 and then connected to the heating element 32, or positioned remotely from the main body 12 and connected to heating element 32, for example, by wire.

In one embodiment, electric current flows from the power source 36 to the heating element 32 to energize the heating element 32 upon connection of the power source 36 to the heating element 32. In another embodiment, a control knob or switch 44 may be used to selectively control the electric current flowing to the heating element 42. Accordingly, a temperature of the heating element 42 may be selectively controlled.

In the embodiments above, the heating element 32 of a bottle cage 10 may be energized to release thermal (heat) energy. With a bottle positioned in the bottle cage 10, the thermal energy may be transferred to the bottle, for example, by conduction, and in turn, the contents of the bottle (i.e., the refreshment). Accordingly, the contents of the bottle may be maintained at a temperature where the contents remain in a liquid state. Thus, in cold weather or below freezing temperatures, the contents of the bottle may be prevented from freezing or solidifying, and the cyclist may consume the contents in their liquid state. The heated bottle cage may be used with standard size bottles, or, alternatively, may be manufactured having dimensions suitable for use with non-standard bottles.

It is understood that features from the various embodiments above may be combined and used together with features from other embodiments above, even if such a combination is not specifically described herein or shown in the figures.

It should also be understood that various changes and modifications to the presently disclosed embodiments will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A bottle cage for a bicycle, the bottle cage comprising:
   a main body comprising:
      an elongated spine configured for mounting to an adjacent portion of a bicycle frame;
      a base tab extending from the elongated spine; and
      at least one band extending from the elongated spine for engaging a bottle positioned within the bottle cage;

a heating element for applying heat to a bottle positioned within the bottle cage wherein the heating element extends along the base tab and the elongated spine; and a housing configured to house a power source that is operatively connected to the heating element for providing energy to the heating element.

2. The bottle cage of claim 1, wherein the heating element is an electrically conductive metallic layer and the power source is electrically connected to the metallic layer to heat the metallic layer through resistance heating.

3. The bottle cage of claim 2, wherein the main body includes a first layer and a second layer, and the metallic layer is positioned between the first layer and the second layer such that the metallic layer is embedded in the main body.

4. The bottle cage of claim 2, wherein the metallic layer is positioned on an outer surface of the main body such that the metallic layer is exposed to surrounding atmosphere.

5. The bottle cage of claim 1, wherein the metallic layer is a metallic foil.

6. The bottle cage of claim 1, wherein the power source is a battery.

7. The bottle cage of claim 6, wherein the battery is a rechargeable battery.

8. The bottle cage of claim 1, wherein the housing is detachably secured to the main body.

9. The bottle cage of claim 8, wherein the housing is detachably secured to the bottom tab.

10. The bottle cage of claim 1, wherein the housing is integrally and non-detachably formed with the main body.

11. The bottle cage of claim 1, further comprising two fastening holes positioned in the elongated spine configured to receive fasteners for securing the main body to the bicycle frame.

12. The bottle cage of claim 1, wherein the elongated spine has a projection formed therein for engaging a corresponding recess on a bottle.

13. The bottle cage of claim 1, wherein the at least one band includes two bands extending from laterally opposite sides of the longitudinal spine.

14. The bottle cage of claim 1, further comprising a control switch operably connected to the power source to actuate the power source and control energy supplied to the heating element.

15. The bottle cage of claim 1, wherein the elongated spine is curved across a width thereof.

16. A bottle cage for a bicycle, the bottle cage comprising:
a main body comprising:
an elongated spine configured for mounting to an adjacent portion of a bicycle frame;
a base tab extending from the elongated spine; and
at least one band extending from the elongated spine for engaging a bottle positioned within the bottle cage; and
a heating element for applying heat to a bottle positioned within the bottle cage wherein the heating element extends along one of more of the elongated spine and the at least one band; and
an electrical connection in electrical communication with the heating element;
wherein the heating element is configured for operative connection, via the electrical connection, to a power source to receive an electric current from the power source.

17. The bottle cage of claim 16, further comprising a housing detachably secured to the main body.

18. The bottle cage of claim 16, further comprising a housing non-detachably formed with the main body.

19. The bottle cage of claim 16, wherein the electrical connection is a terminal formed integrally as one piece with the heating element.

* * * * *